United States Patent
Shimada

(10) Patent No.: US 11,686,856 B2
(45) Date of Patent: Jun. 27, 2023

(54) SYSTEM AND METHOD FOR WORK MACHINE

(71) Applicant: KOMATSU LTD., Tokyo (JP)

(72) Inventor: Kenjiro Shimada, Tokyo (JP)

(73) Assignee: KOMATSU LTD., Tokyo (JP)

(*) Notice: Subject to any disclaimer, the term of this patent is extended or adjusted under 35 U.S.C. 154(b) by 378 days.

(21) Appl. No.: 17/045,950

(22) PCT Filed: Aug. 26, 2019

(86) PCT No.: PCT/JP2019/033245
§ 371 (c)(1),
(2) Date: Oct. 7, 2020

(87) PCT Pub. No.: WO2020/066409
PCT Pub. Date: Apr. 2, 2020

(65) Prior Publication Data
US 2021/0148093 A1    May 20, 2021

(30) Foreign Application Priority Data

Sep. 28, 2018  (JP) .............................. JP2018-184086

(51) Int. Cl.
*G01S 19/40* (2010.01)
*E02F 9/26* (2006.01)
(Continued)

(52) U.S. Cl.
CPC .............. *G01S 19/40* (2013.01); *E02F 9/264* (2013.01); *E02F 9/2225* (2013.01); *G01S 19/23* (2013.01); *G01S 19/42* (2013.01)

(58) Field of Classification Search
CPC .......... G01S 19/40; G01S 19/23; G01S 19/42; G01S 19/00; E02F 9/264
(Continued)

(56) References Cited

U.S. PATENT DOCUMENTS 7,831,362 B2 * 11/2010 Ishibashi ............... E02F 9/2045
                                                    701/470
8,838,329 B2 *  9/2014 Seki ....................... G01C 15/00
                                                    701/33.1
(Continued)

FOREIGN PATENT DOCUMENTS

JP     2012-233353 A    11/2012
JP     2018-16973 A      2/2018
(Continued)

OTHER PUBLICATIONS

The International Search Report for the corresponding international application No. PCT/JP2019/033245, dated Sep. 24, 2019.

*Primary Examiner* — Chuong P Nguyen
(74) *Attorney, Agent, or Firm* — Global IP Counselors, LLP

(57) ABSTRACT

A system includes a receiver mounted on a work machine, and a processor. The receiver receives a signal usable to identify a position of the work machine. The processor acquires a position of the receiver from the signal received by the receiver. The processor acquires a calculated position of a calibration point in the work machine by calculating a position of the calibration point from the position of the receiver. The processor acquires an actual position of the calibration point. The processor generates calibration data usable to calibrate a position of a reference point in the work machine by comparing the actual position with the calculated position of the calibration point.

18 Claims, 9 Drawing Sheets

(51) Int. Cl.
*E02F 9/22* (2006.01)
*G01S 19/23* (2010.01)
*G01S 19/42* (2010.01)

(58) Field of Classification Search
USPC .............. 342/357.23, 357.62, 357.2, 357.25; 701/32.4
See application file for complete search history.

(56) References Cited

U.S. PATENT DOCUMENTS

| | | | | |
|---|---|---|---|---|
| 8,843,279 | B2* | 9/2014 | Tafazoli Bilandi | E02F 9/264 |
| | | | | 701/50 |
| 9,020,693 | B2* | 4/2015 | Seki | G01S 19/42 |
| | | | | 701/34.4 |
| 9,113,588 | B2* | 8/2015 | Kormann | G01S 19/51 |
| 9,157,216 | B2* | 10/2015 | Seki | G01S 19/23 |
| 9,481,984 | B2* | 11/2016 | Iwamura | G01D 5/14 |
| 9,617,717 | B2* | 4/2017 | Kondo | E02F 9/264 |
| 10,378,186 | B2* | 8/2019 | Hiromatsu | E02F 3/32 |
| 10,968,607 | B2* | 4/2021 | Iwamura | E02F 9/2004 |
| 11,441,294 | B2* | 9/2022 | Kawamoto | G01S 5/163 |
| 2013/0158788 | A1 | 6/2013 | Seki | |
| 2015/0330060 | A1* | 11/2015 | Seki | G01S 19/14 |
| | | | | 701/33.1 |
| 2016/0281334 | A1 | 9/2016 | Iwamura et al. | |
| 2016/0376772 | A1 | 12/2016 | Kondo et al. | |
| 2018/0171598 | A1 | 6/2018 | Iwamura et al. | |
| 2019/0093315 | A1 | 3/2019 | Ishibashi et al. | |
| 2021/0293972 | A1* | 9/2021 | Tamazato | E02F 9/264 |
| 2022/0026587 | A1* | 1/2022 | Hayakawa | E02F 9/265 |
| 2022/0081879 | A1* | 3/2022 | Harada | E02F 3/841 |
| 2022/0389687 | A1* | 12/2022 | Kamado | E02F 9/264 |

FOREIGN PATENT DOCUMENTS

| | | |
|---|---|---|
| WO | 2015/137526 A1 | 9/2015 |
| WO | 2015/186845 A1 | 12/2015 |
| WO | 2017/072877 A1 | 5/2017 |

* cited by examiner

SYSTEM AND METHOD FOR WORK MACHINE

CROSS-REFERENCE TO RELATED APPLICATIONS

This application is a U.S. National stage application of International Application No. PCT/JP2019/033245, filed on Aug. 26, 2019. This U.S. National stage application claims priority under 35 U.S.C. § 119(a) to Japanese Patent Application No. 2018-184086, filed in Japan on Sep. 28, 2018, the entire contents of which are hereby incorporated herein by reference.

BACKGROUND

Field of the Invention

The present invention relates to a system and a method for a work machine.

Background Information

In a work machine, a reference point position in the work machine is detected and the work machine is controlled based on the acquired reference point position. For example, in the work vehicle described in Japanese Patent Laid-open No. 2018-16973, a controller calculates the position of a receiver of a global navigation satellite system (GNSS) from signals received by the receiver. The controller calculates the blade tip position from the position of the receiver. The controller controls the blade so that the calculated blade tip position operates according to a desired locus.

SUMMARY

In the abovementioned work machine, the controller stores data for calculating the position of the reference point from the position of the receiver. The data includes many types of data such as the position of a point of origin set on the work machine, the distance from the point of origin to the receiver, the distance from the point of origin of a lift frame that supports the blade, the dimensions of the lift frame, the dimensions of the blade, and the like. The controller uses the types of data to calculate the blade tip position from the position of the receiver.

However, if there is an error in the data, the calculated blade tip position does not match the actual position, making it difficult to calculate the blade tip position accurately.

As a result, the following type of work is performed to improve the accuracy of the detection of the position of the reference point in the work machine. For example, mirrors are attached to a plurality of portions of the work machine such as the receiver, the point of origin, the reference point, and the like. Next, a person uses a measurement device such as a total station or the like to measure the positions of the portions. The person then enters the coordinates of the measured positions and the computer performs calculations whereby the above data is calibrated.

The above calibration work requires many man-hours and is complicated. An object of the present invention is to easily and accurately detect the position of a reference point included in the work machine with fewer man-hours.

A system according to a first aspect includes a receiver and a processor. The receiver is mounted to a work machine and receives a signal for identifying a position of the work machine. The processor is programmed to execute the following processes. The processor acquires a position of the receiver from the signal received by the receiver. The processor calculates a calibration point in the work machine from the position of the receiver thereby acquiring a calculated position of the calibration point. The processor acquires an actual position of the calibration point. The processor compares the actual position of the calibration point with the calculated position thereby generating calibration data for calibrating a position of a reference point in the work machine.

A method according to a second aspect is a method executed by a processor. The method includes the following processes. A first process is acquiring a position of a receiver from a signal for identifying a position of a work machine received by a receiver mounted on the work machine. A second process is calculating a position of a calibration point in the work machine from a position of the receiver thereby acquiring a calculated position of the calibration point. A third process is acquiring an actual position of the calibration point. A fourth process is comparing the actual position of the calibration point with the calculated position thereby generating calibration data for calibrating a position of a reference point in the work machine.

In the present invention, the actual position of the calibration point in the work machine is compared with the calculated position by the processor thereby generating calibration data for calibrating the position of a reference point in the work machine. As a result, the position of a reference point in the work machine can be detected accurately and easily with fewer man-hours.

DETAILED DESCRIPTION OF EMBODIMENT(S)

Figure 1:
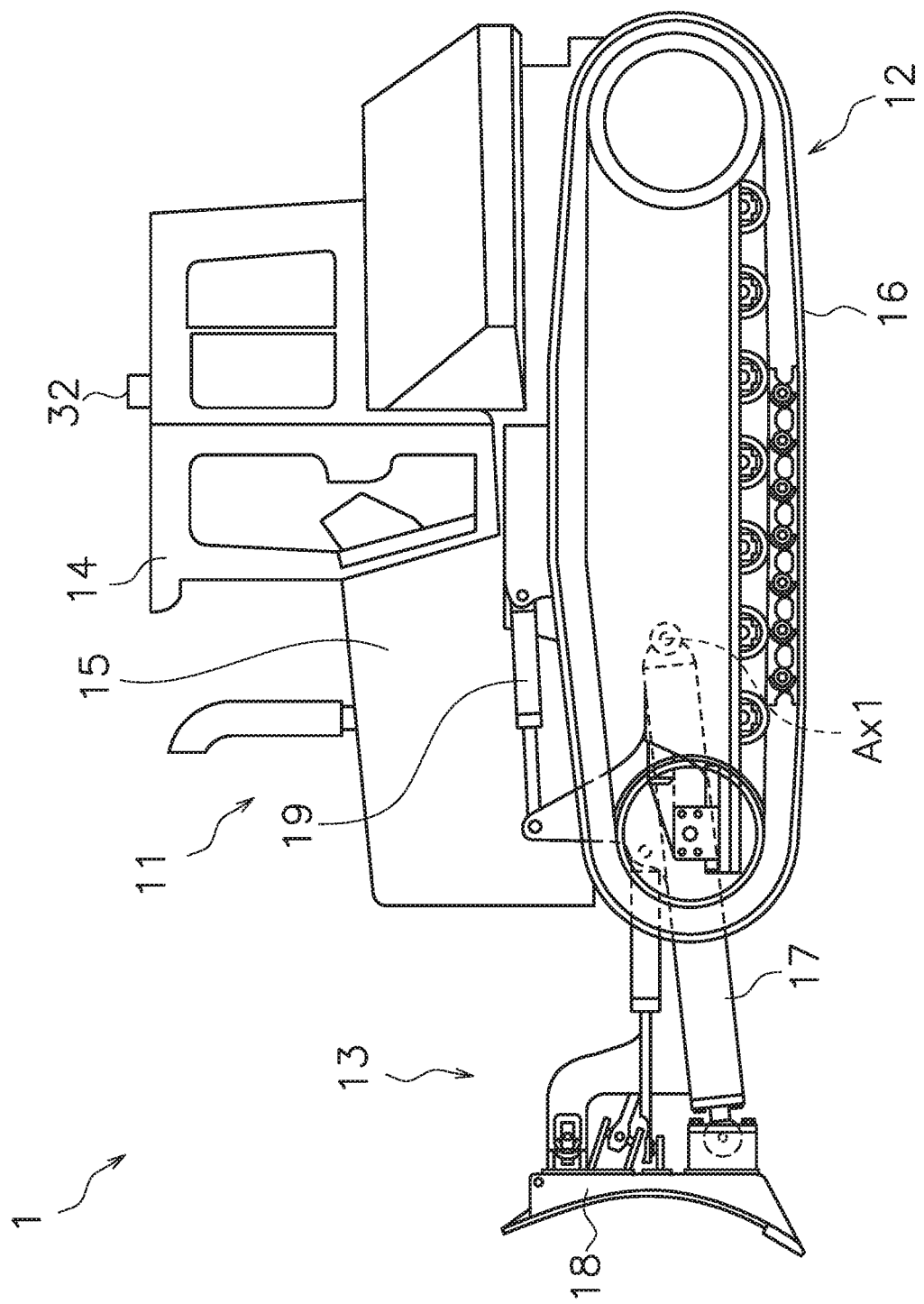
FIG. 1 is a side view of a work machine according to an embodiment.

A work machine according to an embodiment is discussed hereinbelow with reference to the drawings. FIG. 1 is a side view of a work machine 1 according to an embodiment. The work machine 1 according to the present embodiment is a bulldozer. The work machine 1 includes a vehicle body 11, a travel device 12, and a work implement 13.

The vehicle body 11 has an operating cabin 14 and an engine compartment 15. An operators seat that is not illustrated is disposed inside the operating cabin 14. The engine compartment 15 is disposed in front of the operating cabin 14. The travel device 12 is attached to a bottom part of the vehicle body 11. The travel device 12 includes a left and right pair of crawler belts 16. The work machine 1 travels due to the rotation of the crawler belts 16.

The work implement 13 is movably attached to the vehicle body 11. The work implement 13 has a lift frame 17, a blade 18, and a lift cylinder 19. The lift frame 17 is attached to the vehicle body 11 in a manner that allows movement up and down about an axis Ax1 that extends in the vehicle width direction. The lift frame 17 supports the blade 18.

The blade 18 is disposed in front of the vehicle body 11. The blade 18 moves up and down accompanying the up and down movements of the lift frame 17. The lift cylinder 19 is coupled to the vehicle body 11 and the lift frame 17. Due to the extension and contraction of the lift cylinder 19, the lift frame 17 rotates up and down about the axis Ax1.

Figure 2:
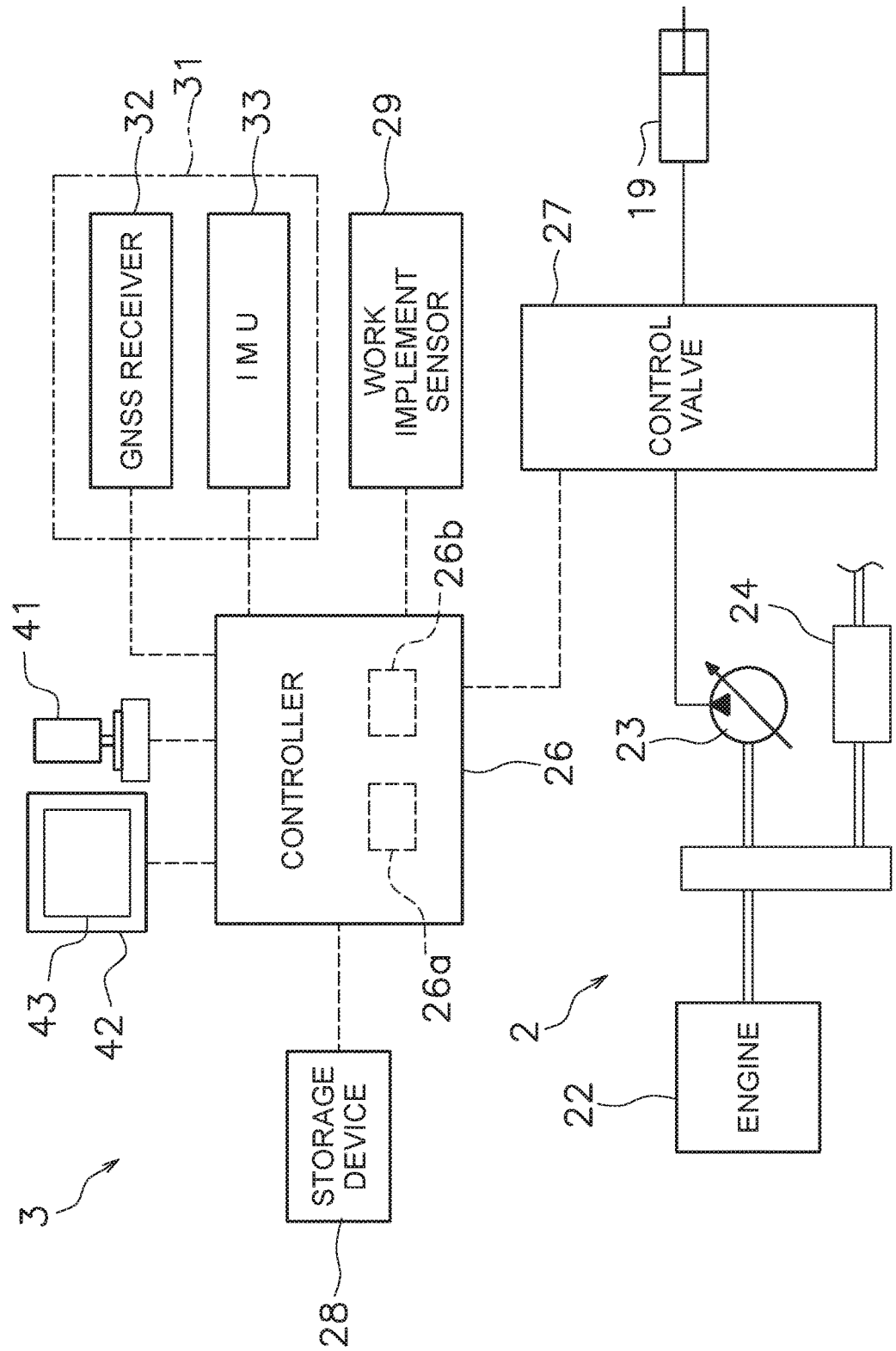
FIG. 2 is a block diagram illustrating a configuration of a drive system and a control system of the work machine.

FIG. 2 is a block diagram illustrating a configuration of a drive system 2 and a control system 3 of the work machine 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydrostatic transmission (HST), for example. Alternatively, the power transmission device 24, for example, may be a transmission having a torque converter or a plurality of speed change gears.

The control system 3 includes an operating device 41, an input device 42, a display 43, a controller 26, a control valve 27, and a storage device 28. The operating device 41, the input device 42, the display 43, the control valve 27, and the storage device 28 are connected by wire or wirelessly to the controller 26.

The operating device 41 is a device for operating the work implement 13 and the travel device 12. The operating device 41 is disposed in the operating cabin 14. The operating device 41 receives operations from an operator for driving the work implement 13 and the travel device 12, and outputs operation signals in accordance with the operations. The operating device 41 includes, for example, an operating lever, a pedal, and a switch and the like.

The input device 42 and the display 43 are, for example, touch screen-type display input devices. The display 43 is, for example, an LCD or an OLED. However, the display 43 may be another type of display device. The input device 42 and the display 43 may be separate devices. For example, the input device 42 may be an input device such as a switch. The input device 42 outputs an operation signal indicating an operation by the operator to the controller 26.

The controller 26 is programmed to control the work machine 1 based on acquired data. The controller 26 includes, for example, a processing device (processor) 26a such as a CPU, and a memory 26b. The memory 26b may include a volatile memory such as a RAM or the like, or a non-volatile memory such as a ROM or the like. The controller 26 acquires operation signals from the operating device 41.

The storage device 28 may be a semiconductor memory or a hard disk and the like. The storage device 28 is an example of a non-transitory computer-readable recording medium. The storage device 28 records computer commands that are executable by the processor and that are for controlling the work machine 1.

The control valve 27 is a proportional control valve and is controlled with command signals from the controller 26. The control valve 27 is disposed between the hydraulic pump 23 and hydraulic actuators such as the lift cylinder 19. The control valve 27 controls the flow rate of the hydraulic fluid supplied from the hydraulic pump 23 to the lift cylinder 19.

The controller 26 controls the engine 22, the hydraulic pump 23, the power transmission device 24, and the control valve 27 in accordance with the operations of the above-mentioned operating device 41. For example, the controller 26 controls the control valve 27 so that the blade 18 moves in accordance with the operations of the operating device 41. As a result, the lift cylinder 19 is controlled in response to the operation amount of the operating device 41. The control valve 27 may be a pressure proportional control valve. Alternatively, the control valve 27 may be an electromagnetic proportional control valve.

The control system 3 includes a position detection device 31. The position detection device 31 detects the position of the work machine 1. The position detection device 31 includes a GNSS receiver 32 and an inertial measurement unit (IMU) 33. The GNSS receiver 32 is, for example, a receiving apparatus for a global positioning system (GPS). For example, an antenna of the GNSS receiver 32 is disposed on the operating cabin 14. However, the antenna of the GNSS receiver 32 may be disposed in another position.

The GNSS receiver 32 receives positioning signals from a satellite and calculates the position of the GNSS receiver 32 from the positioning signals. The controller 26 acquires receiver position data indicative of the position of the GNSS receiver 32, from the GNSS receiver 32. The receiver position data is represented by global coordinates of the GNSS receiver 32.

The IMU 33 generates vehicle body inclination angle data. The vehicle body inclination angle data includes the angle (pitch angle) with respect to horizontal in the front-back direction of the work machine 1, and the angle (roll angle) with respect to horizontal in the transverse direction of the work machine 1. The controller 26 obtains the vehicle body inclination angle data from the IMU 33.

Figure 3:
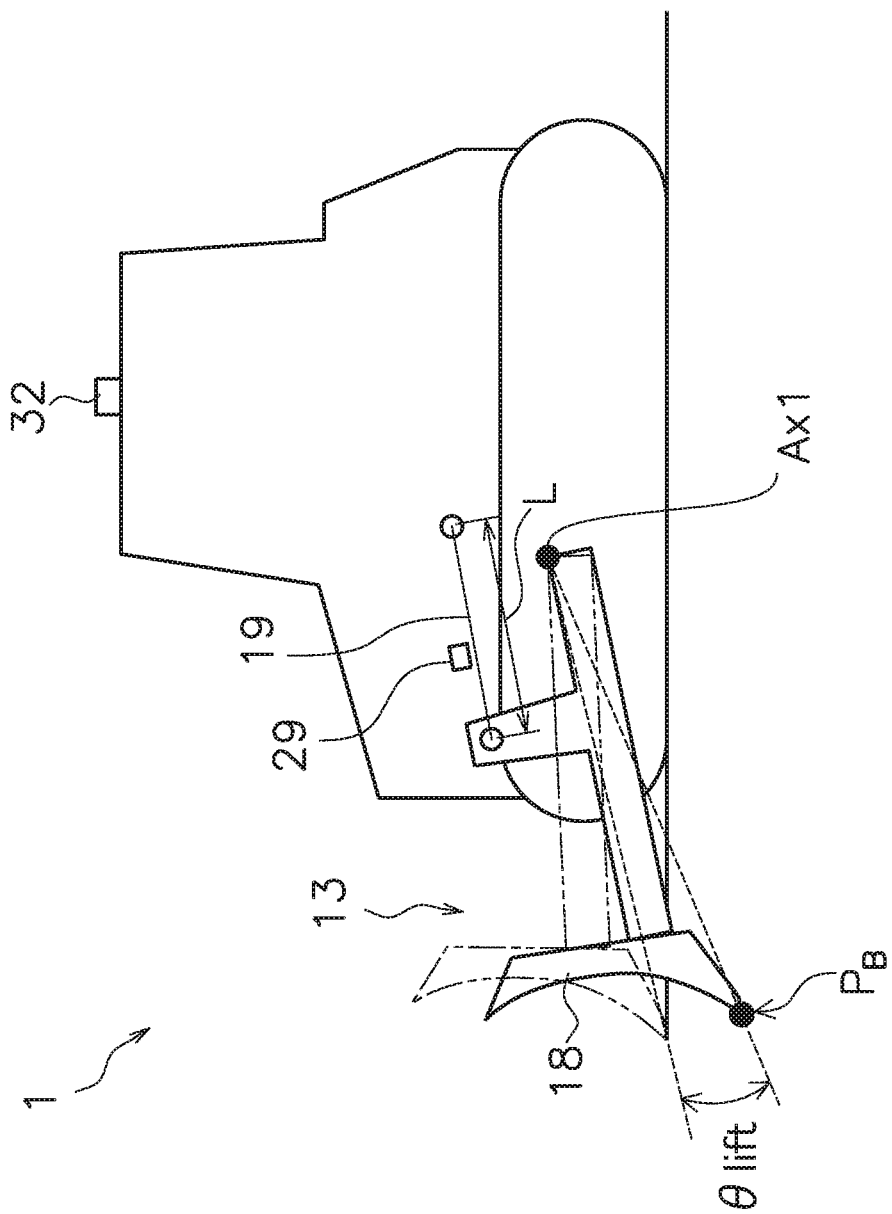
FIG. 3 is a schematic view of a configuration of the work machine.

The control system 3 includes a work implement sensor 29. The work implement sensor 29 detects the attitude of the work implement 13 and acquires work implement attitude data which indicates the attitude of the work implement 13. For example, the work implement sensor 29 is a stroke sensor of the lift cylinder 19. FIG. 3 is a schematic view of a configuration of the work machine 1. As illustrated in FIG. 3, an attitude sensor detects the stroke length (referred to below as "lift cylinder length L") of the lift cylinder 19. The controller 26 calculates a lift angle θlift of the blade 18 based on the lift cylinder length L.

The basic attitude of the work implement 13 is depicted as a chain double-dashed line in FIG. 3. The basic attitude of the work implement 13 is the position of the blade 18 while the blade tip of the blade 18 is in contact with the ground surface on a horizontal ground surface. The lift angle θlift is the angle from the basic attitude of the work implement 13.

The controller 26 calculates the position of a reference point $P_B$ in the work machine 1 from the receiver position data, the vehicle body inclination angle data, and the work implement attitude data. The position of the reference point $P_B$ is represented by coordinates in the global coordinate system of the reference point $P_B$. The reference point $P_B$ is included on the blade 18. Specifically, the reference point $P_B$ is the center in the vehicle width direction on the blade tip of the blade 18. However, the reference point $P_B$ may be another position.

The controller 26 controls the work machine 1 based on the reference point $P_B$. For example, the controller 26 controls the work implement 13 so that the reference point $P_B$ moves along a predetermined locus.

Figure 4:
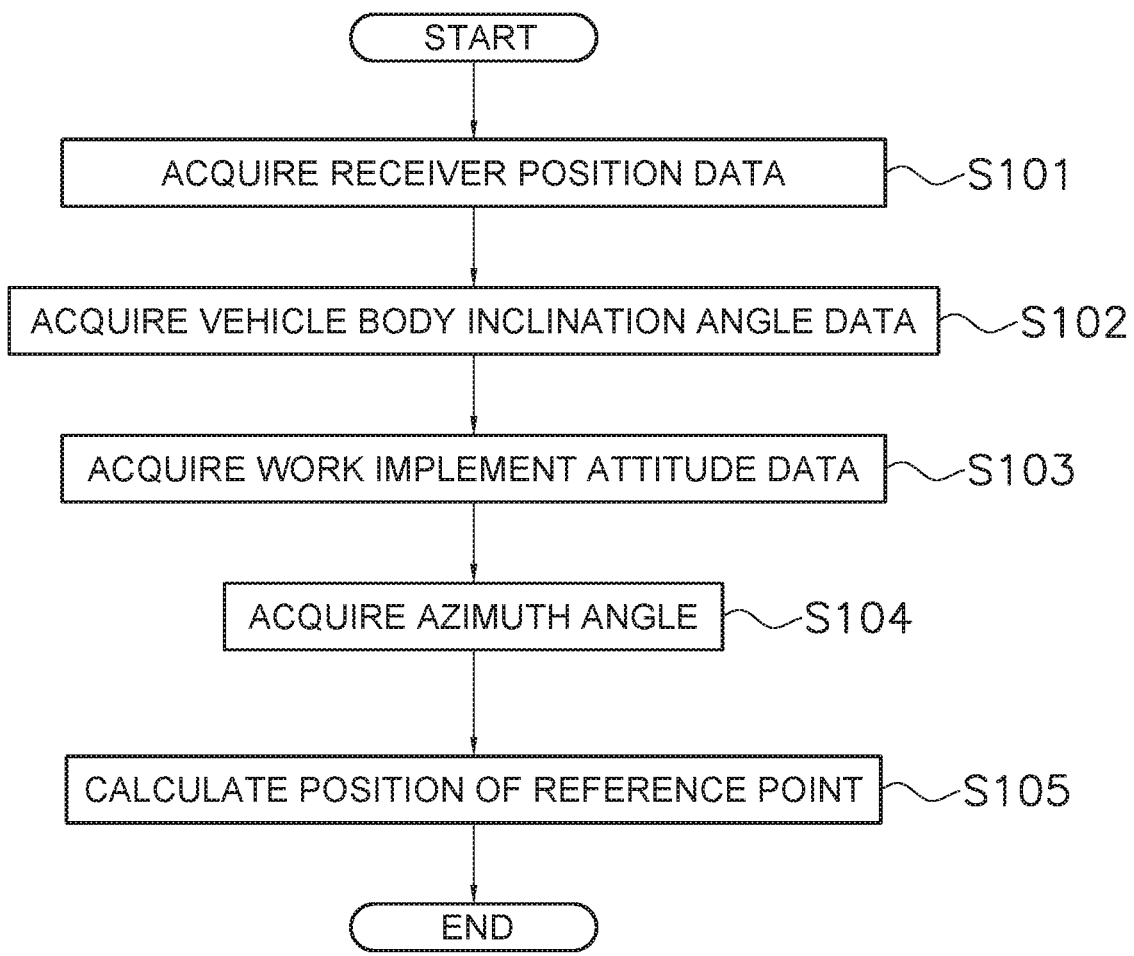
FIG. 4 is a flow chart illustrating processing for calculating the position of a reference point.

FIG. 4 is a flow chart illustrating processing executed by the controller 26 for calculating the position of the reference point $P_B$. As illustrated in step S101 in FIG. 4, the controller 26 acquires the receiver position data. As indicated above, the GNSS receiver 32 receives positioning signals from a satellite of the GNSS and the controller 26 acquires the receiver position data from the GNSS receiver 32.

In step S102, the controller 26 acquires the vehicle body inclination angle data. As indicated above, the IMU 33 detects the pitch angle and the roll angle of the vehicle body 11 and the controller 26 acquires the vehicle body inclination angle data from the IMU 33.

In step S103, the controller 26 acquires the work implement attitude data. As indicated above, the work implement sensor 29 detects the lift cylinder length L and the controller 26 calculates the lift angle θlift of the blade 18 based on the lift cylinder length L.

Figure 5:
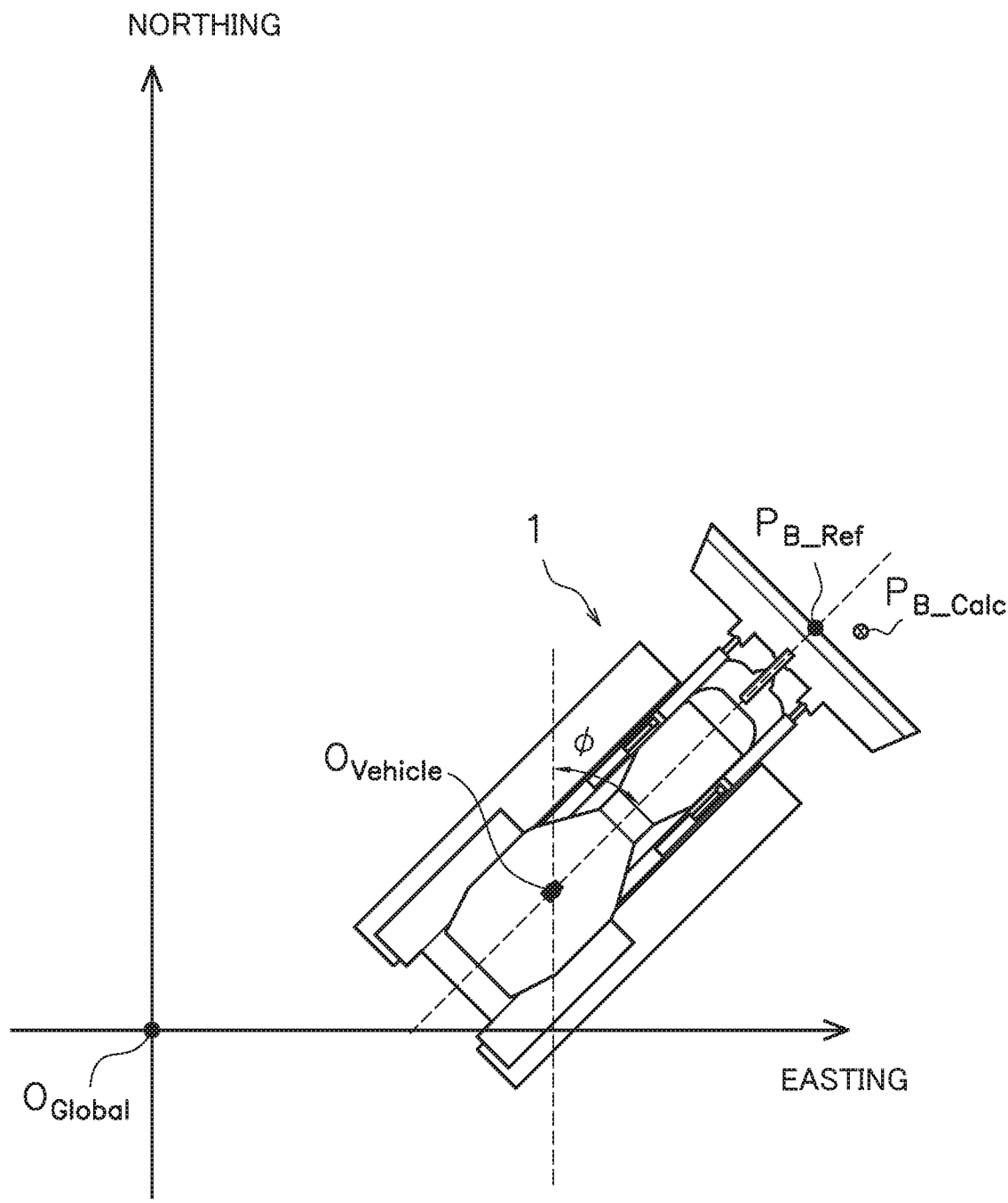
FIG. 5 illustrates an azimuth angle of the work machine.

In step S104, the controller 26 acquires an azimuth angle φ of the work machine 1. As illustrated in FIG. 5, the azimuth angle φ represents the angle in the traveling direction of the work machine 1 with respect to a predetermined reference azimuth in the global coordinate system. In the present embodiment, the predetermined reference azimuth is true north and anticlockwise is positive. However, the reference azimuth is not limited to true north and may be another azimuth. The controller 26 calculates the azimuth angle φ of the work machine 1 from changes in the position of the GNSS receiver 32 detected by the GNSS receiver 32.

In step S105, the controller 26 calculates the position of the reference point from the receiver position data. Specifically, the controller 26 uses the vehicle body dimension data, the abovementioned work implement attitude data, the vehicle body inclination angle data, and the azimuth angle φ of the work machine 1 to calculate the position of the reference point $P_B$ from the position of the GNSS receiver 32. The vehicle body dimension data is stored in the storage device 28 and represents the position of the work implement 13 with respect to the GNSS receiver 32.

For example, the vehicle body dimension data includes the position of the vehicle body point of origin $O_{Vehicle}$ in the local coordinate system set to the vehicle body 11. The vehicle body dimension data includes the distance from the vehicle body point of origin Override to the GNSS receiver 32, the distance from the vehicle body point of origin $O_{vehicle}$ to the lift frame 17, the dimensions of the lift frame 17, the dimensions of the blade 18, and the position of the reference point $P_B$ on the blade 18.

Figure 6:
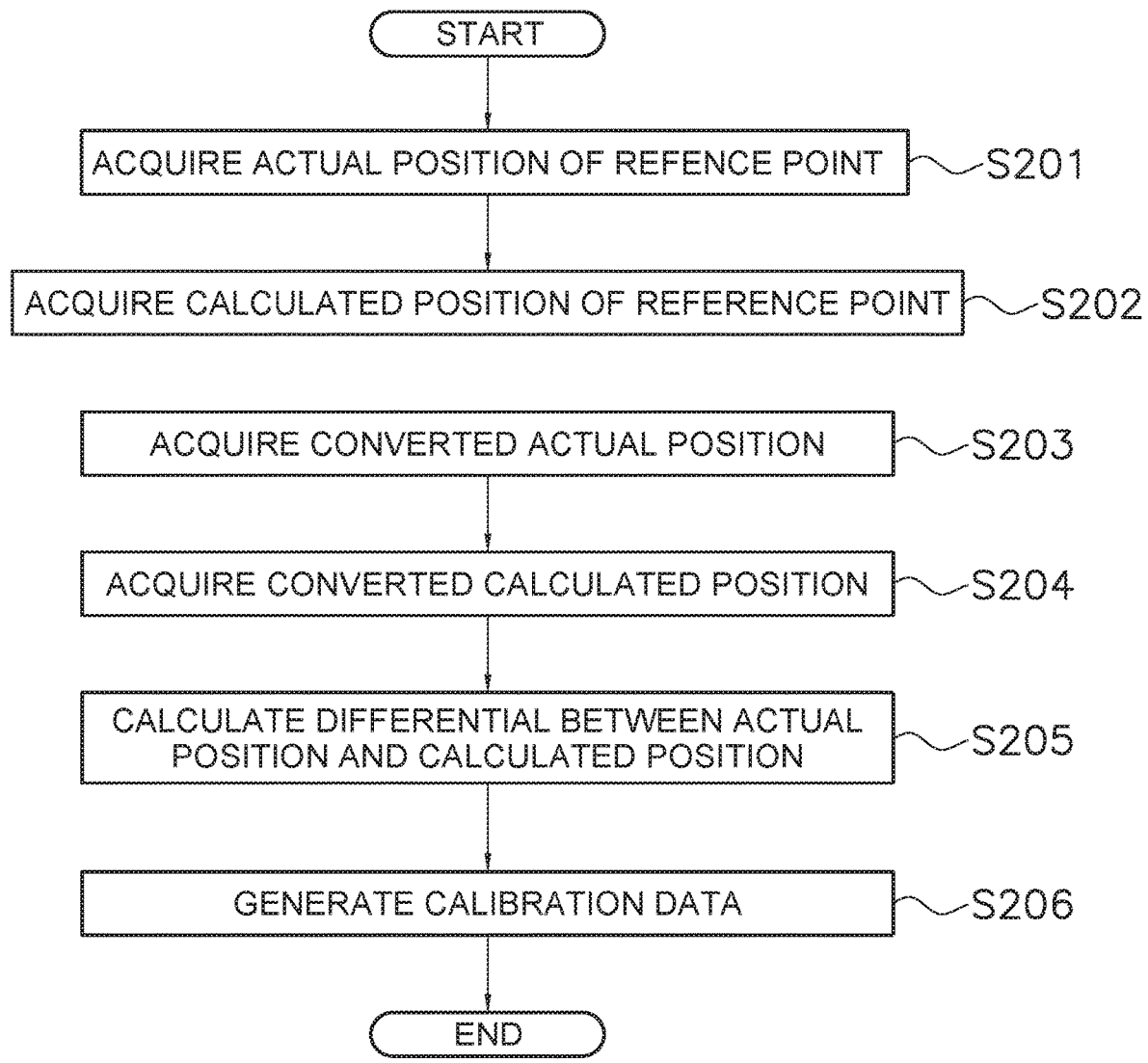
FIG. 6 is a flow chart illustrating processing for calibrating the position detection of the reference point.

The calibration processing for detecting the position of the reference point $P_B$ is discussed next. FIG. 6 is a flow chart illustrating processing executed by the controller 26 for calibrating the position detection of the reference point $P_B$. The controller 26 calculates the position of a predetermined calibration point included on the work machine 1 to acquire a calculated position of the calibration point, and compares the actual position and the calculated position of the calibration point to generate calibration data for calibrating the position of the reference point $P_B$. The calibration point is preferably a portion the position of which does not change with respect to the reference point $P_B$ even when the work implement 13 is operated. For example, the calibration point is included on the blade 18. In the present embodiment, the calibration point is the reference point $P_B$. That is, the controller compares the actual position and the calculated position of the reference point $P_B$ to generate the calibration data for calibrating the position of the reference point $P_B$.

As illustrated in step S201 in FIG. 6, the controller 26 acquires the actual position $P_{B\_Ref}$ of the reference point $P_B$. The controller 26 acquires the actual position $P_{B\_Ref}$ of the reference point $P_B$ via the input device 42. Specifically the operator operates the input device 42 to input the coordinates which represent the actual position $P_{B\_Ref}$ of the reference point $P_B$, whereby the controller 26 acquires the actual position $P_{B\_Ref}$ of the reference point $P_B$.

Figure 7:
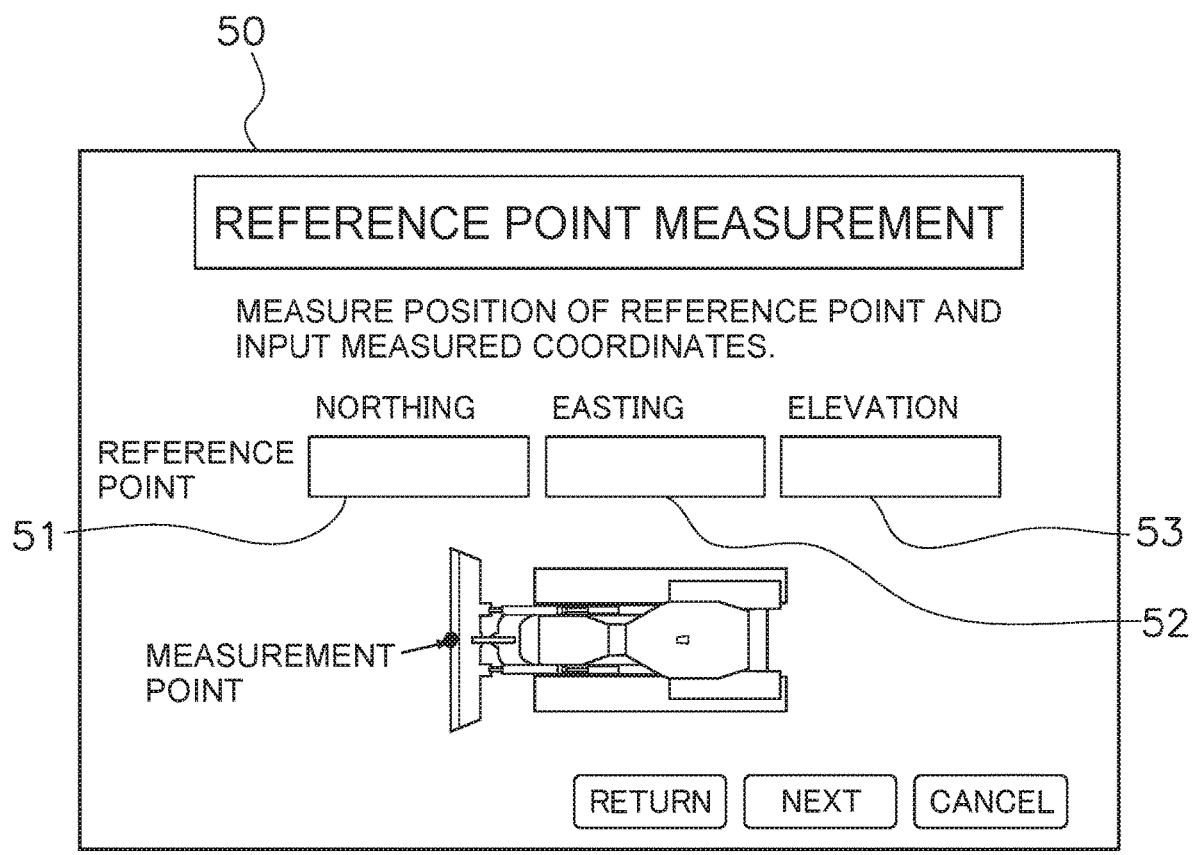
FIG. 7 illustrates an example of an operating screen for inputting the actual position of the reference point.

FIG. 7 illustrates an example of an operating screen 50 for inputting the actual position $P_{B\_Ref}$ of the reference point $P_B$. The controller 26 displays the operating screen 50 on the display 43. As illustrated in FIG. 7, the operating screen 50 includes input fields 51-53 for inputting the coordinates of the actual position $P_{B\_Ref}$ of the reference point $P_B$. The input fields 51-53 include a longitude input field 51, a latitude input field 52, and an elevation input field 53.

The operator uses a measurement device such as a total station or a GNSS rover to measure the actual position $P_{B\_Ref}$ of the reference point $P_B$. The operator then inputs the coordinates representing the actual position $P_{B\_Ref}$ of the reference point $P_B$ into the input fields 51-53 of the operating screen 50. The controller 26 acquires the coordinates inputted into the input fields 51-53 as the actual position $P_{B\_Ref}$ of the reference point $P_B$. The actual position $P_{B\_Ref}$ of the reference point $P_B$ is represented by coordinates ($N_{B\_Ref}$, $E_{B\_Ref}$, $Ele_{B\_Ref}$) in the global coordinate system.

In step S202, the controller 26 acquires the calculated position of the reference point $P_B$. The controller 26 calculates the position of the reference point $P_B$ from the position of the GNSS receiver 32 using the processing described above in FIG. 4, thereby acquiring a calculated position $P_{B\_Calc}$ of the reference point $P_B$. The calculated position $P_{B\_Calc}$ of the reference point $P_B$ is represented by coordinates ($N_{B\_Calc}$, $E_{B\_Calc}$, $Ele_{B\_Calc}$) in the global coordinate system.

Specifically, the controller 26 derives a representative value from positions of the GNSS receiver 32 acquired a plurality of times over a predetermined time period after the start of the calibration processing, and acquires the calculated position $P_{B\_Calc}$ of the reference point $P_B$ from the representative value.

The predetermined time period is a previously set value and is saved in the storage device 28. The predetermined time period is, for example, about ten minutes. However, the predetermined time period is not limited to ten minutes and may be shorter or longer than ten minutes. The representative value is, for example, an average value of the position of the GNSS receiver 32. However, the representative value is not limited to an average value and may be a central value or the like.

As indicated above, the position of the GNSS receiver 32, the actual position $P_{B\_Ref}$ of the reference point $P_B$, and the calculated position $P_{B\_Calc}$ of the reference point $P_B$ are represented by coordinates in the global coordinate system. In the present embodiment, the global coordinate system is a coordinate system based on Earth. In other words, the global coordinate system is a coordinate system fixed on Earth. Specifically, the position of the GNSS receiver 32, the actual position $P_{B\_Ref}$ of the reference point $P_B$, and the calculated position $P_{B\_Calc}$ of the reference point $P_B$ are represented by coordinates in a rectangular plane coordinate system. However, the global coordinate system is not limited to a rectangular plane coordinate system and may be another coordinate system. The local coordinate system is a coordinate system based on the vehicle body 11. In other words, the local coordinate system is a coordinate system fixed on the vehicle body 11.

Figure 8:
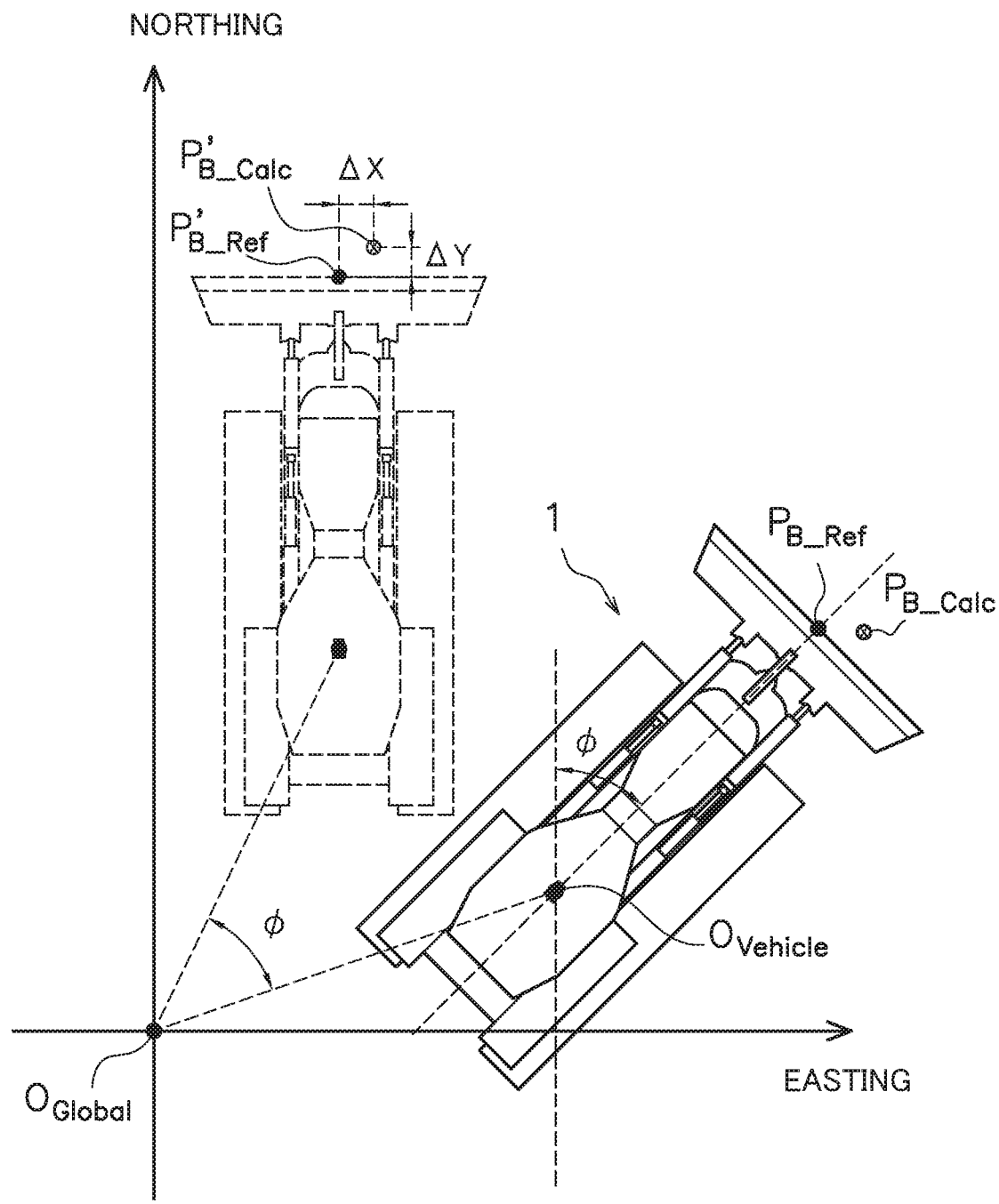
FIG. 8 illustrates the converted actual position and the converted calculated position of the reference point.

In step S203, the controller 26 acquires an actual position $P'_{B\_Ref}$ converted from the reference point $P_B$. Specifically as illustrated in FIG. 8, the controller 26 subjects the actual position $P_{B\_Ref}$ to coordinate conversion in the opposite direction of the azimuth angle φ of the work machine 1 centered about a predetermined point of origin $O_{Global}$ of the global coordinate system, thereby acquiring the converted actual position $P'_{B\_Ref}$. The coordinates ($N'_{B\_Ref}$, $E'_{B\_Ref}$, $Ele_{B\_Ref}$) of the converted actual position $P'_{B\_Ref}$ are represented by the following formula (1).

$$E'_{B\_Ref} = E_{B\_Ref} * \cos φ - N_{B\_Ref} * \sin φ$$

$$N'_{B\_Ref} = E_{B\_Ref} * \sin φ + N_{B\_Ref} * \cos φ \quad (1)$$

In step S204, the controller 26 acquires a calculated position $P'_{B\_Calc}$ converted from the reference point $P_B$. Specifically, as illustrated in FIG. 8, the controller 26 subjects the calculated position $P_{B\_Calc}$ to coordinate conversion in the opposite direction of the azimuth angle φ of the work machine 1 centered about the predetermined point of origin $O_{Global}$ of the global coordinate system, thereby acquiring the converted calculated position $P'_{B\_Calc}$. The coordinates of the converted calculated position $P'_{B\_Calc}$ are represented by the following formula (2).

$$E'_{B\_Calc} = E_{B\_Calc} * \cos φ - N_{B\_Calc} * \sin φ$$

$$N'_{B\_Calc} = E_{B\_Calc} * \sin φ + N_{B\_Calc} * \cos φ \quad (2)$$

In step S205, the controller 26 calculates the differential between the actual position $P_{B\_Ref}$ and the calculated position $P_{B\_Calc}$ of the reference point $P_B$. The controller 26 calculates the differential (ΔX, ΔY, ΔZ) between the converted actual position $P'_{B\_Ref}$ and the converted calculated position $P'_{B\_Calc}$ of the reference point $P_B$. The differential (ΔX, ΔY, ΔZ) is represented by the following formula (3).

$$ΔX = N'_{B\_Calc} - N'_{B\_Ref}$$

$$ΔY = -(E'_{B\_Calc} - E'_{B\_Ref})$$

$$ΔZ = Ele_{B\_Calc} - Ele_{B\_Ref} \quad (3)$$

Figure 9A:
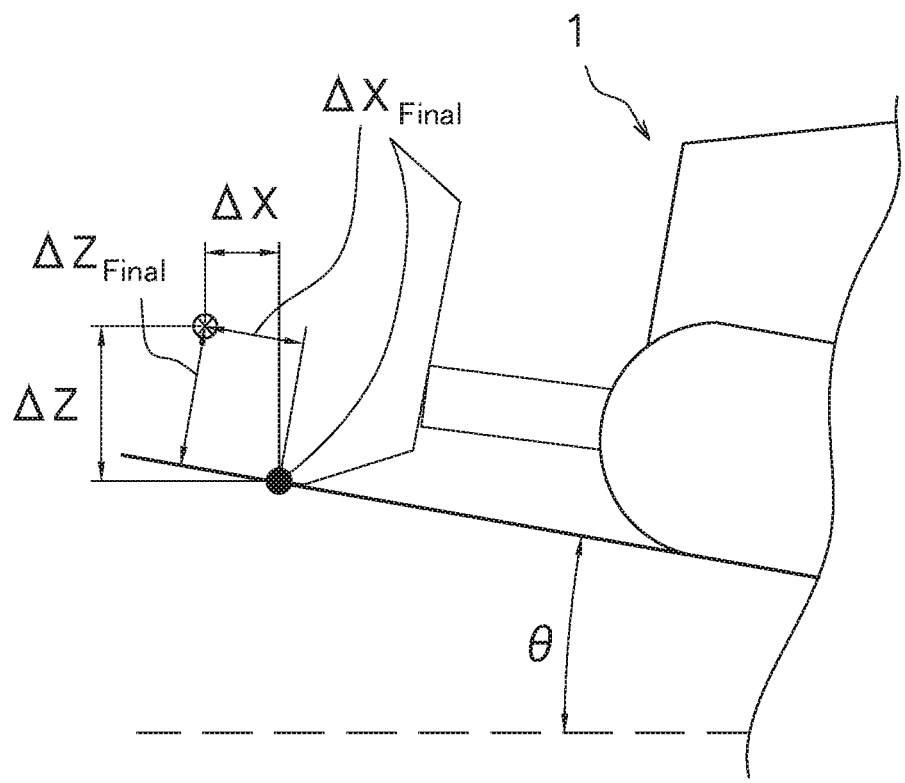
FIG. 9A and FIG. 9B illustrate correcting using the pitch angle and the roll angle of the calculated position.
Figure 9B:
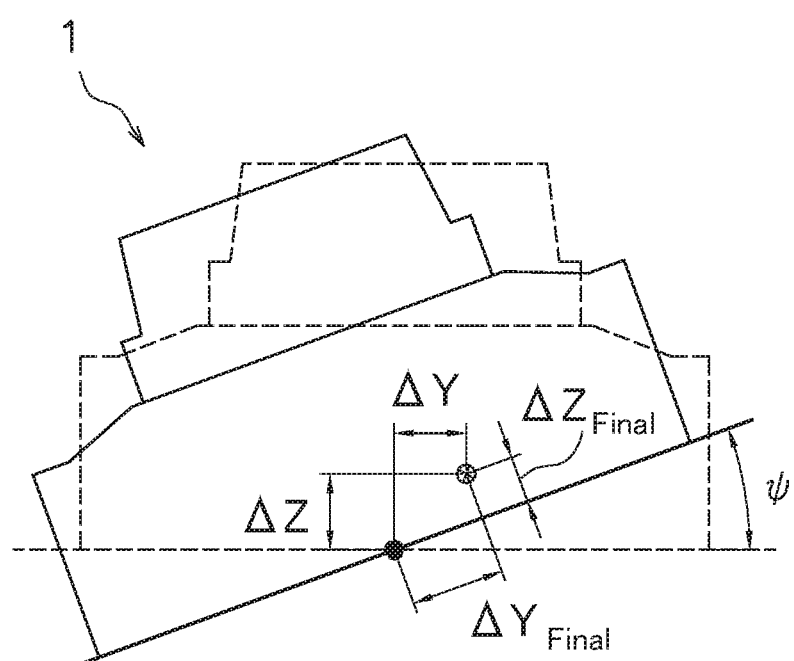

In step S206, the controller 26 generates the calibration data. As illustrated in FIG. 9A, the controller 26 uses the pitch angle θ to correct the differential of the actual position $P_{BS}$ and the calculated position $P_{B\_Calc}$ of the reference point $P_B$ acquired in step S205, thereby generating the calibration data. In addition, as illustrated in FIG. 9B, the controller 26 uses the roll angle ψ to correct the differential of the actual position $P_{B\_Ref}$ and the calculated position $P_{B\_Calc}$ of the reference point $P_B$. The calibration data ($ΔX_{Final}$, $ΔY_{Final}$, $ΔZ_{Final}$) represented by the following formula (4).

$$ΔX_{Final} = ΔX/\cos θ$$

$$ΔY_{Final} = ΔY/\cos ψ$$

$$ΔZ_{Final} = ΔZ * (\cos θ * \cos ψ) \quad (4)$$

The controller 26 saves the generated calibration data in the storage device 28. When the calibration processing is completed, the controller 26 may display the calibration data ($ΔX_{Final}$, $ΔY_{Final}$, $ΔZ_{Final}$) on the display 43.

As discussed above, according to the control system 3 of the work machine 1 according to the present embodiment, the actual position $P_{B\_Ref}$ and the calculated position $P_{B\_Calc}$ of the reference point $P_B$ are compared whereby the calibration data for calibrating the calculated position $P_{B\_Calc}$ is generated. As a result, the position of the reference point $P_B$ included on the work machine can be detected accurately and easily with fewer man-hours.

The controller 26 may correct the vehicle body dimension data with the calibration data. For example, the controller 26 may correct the distance from the vehicle body point of origin $O_{Vehicle}$ to the GNSS receiver 32 with the calibration data. The controller 26 may use the corrected vehicle body dimension data to calculate the calculated position $P_{B\_Calc}$ of the reference point $P_B$. Alternatively, the controller 26 may use the calibration data to correct the position of the reference point $P_B$ calculated using the initial vehicle body dimension data, thereby determining the position of the reference point $P_B$.

The controller 26 calculates the representative value of the position of the GNSS receiver 32 detected by the GNSS receiver 32 within the predetermined time period, and calculates the position of the reference point $P_B$ from the representative data. As a result, the effects of measurement errors of the GNSS receiver 32 can be suppressed and the position of the reference point $P_B$ can be calculated accurately.

The controller 26 generates the calibration data from the differential between the converted actual position $P'_{B\_Ref}$ and the converted calculated position $P'_{B\_Calc}$. As a result, the controller 26 is able to acquire the calibration data that conforms to the local coordinate system fixed on the vehicle body 11.

The controller 26 corrects the differential based on the pitch angle θ thereby generating the calibration data. Consequently, the effects of the pitch angle θ of the vehicle body 11 can be suppressed and the position of the reference point $P_B$ can be calculated accurately.

The controller 26 corrects the differential based on the roll angle ψ thereby generating the calibration data. Consequently, the effects of the roll angle ψ of the vehicle body 11 can be suppressed and the position of the reference point $P_B$ can be calculated accurately.

Although an embodiment of the present invention has been described so far, the present invention is not limited to the above embodiment and various modifications may be made within the scope of the invention.

The work machine 1 is not limited to a bulldozer and may be another type of machine such as a wheel loader or a motor grader and the like.

The work machine 1 may be a vehicle that can be remotely operated. In this case, a portion of the control system 3 may be disposed outside of the work machine 1. For example, the controller 26 may be disposed outside the work machine 1. The controller 26 may be disposed inside a control center separate from the work site.

The controller 26 may include a plurality of controllers separate from each other. The abovementioned processing may be distributed and executed among the plurality of processors 26. For example, the controller 26 may include a remote controller 26 disposed outside of the work machine 1 and an on-board controller 26 mounted on the work machine 1. The remote controller 26 and the on-board controller 26 may be able to communicate wirelessly. The abovementioned calibration processing may be executed by the remote controller 26.

The operating device 41, the input device 42, and the display 43 may be disposed outside of the work machine 1. In this case, the operating cabin may be omitted from the work machine 1. Alternatively, the operating device 41, the input device 42, and the display 43 may be omitted from the work machine 1. The work machine 1 may be operated with only the automatic control by the controller 26 without operations via the operating device 41 or the input device 42.

The reference point $P_B$ is not limited to the center in the vehicle width direction of the blade 18 and may be another portion of the blade 18. For example, the reference point $P_B$ may be a left end section or a right end section of the tip of the blade 18. Alternatively, the reference point $P_B$ is not limited to the blade 18 and may be another portion included in the work implement 13. Alternatively, the reference point $P_B$ may be another portion included in the vehicle body 11.

The input device 42 may be an input port in which the data is inputted from an external device wirelessly or by wire. Alternatively, the input device 42 may be an input port connected to a recording medium and data may be inputted from the recording medium. The controller 26 may acquire the actual position $P_{B\_Ref}$ of the reference point $P_B$ by receiving data via such an input device 42.

Alternatively, the controller 26 may acquire the actual position $P_{B\_Ref}$ of the reference point $P_B$ with another means. For example, the reference point $P_B$ may be disposed at a previously known point whereby the controller 26 may acquire the coordinates of the previously known point as the actual position $P_{B\_Ref}$ of the reference point $P_B$.

In the above embodiment, the calibration point for calibrating the detection of the position of the reference point $P_B$ is the same position as the reference point $P_B$. However, the calibration point may be in a position different from the reference point $P_B$. For example, both ends of the blade 18 may be respectively detected as a first calibration point and a second calibration point. The calibration data may be generated from an average of the differential between the actual position and the calculated position of the first calibration point and the differential between the actual position and the calculated position of the second calibration point.

According to the present invention, the position of a reference point included on a work machine can be detected accurately and easily with fewer man-hours.

The invention claimed is:

1. A system comprising:
   a receiver mounted on a work machine, the receiver receiving a signal usable to identify a position of the work machine; and
   a processor configured to
   acquire a position of the receiver from the signal received by the receiver,
   acquire a calculated position of a calibration point on the work machine by calculating a position of the calibration point based on the position of the receiver and vehicle body dimension data of the work machine,
   acquire an actual position of the calibration point by measuring with a measurement device, and
   generate calibration data usable to calibrate a position of a reference point on the work machine by comparing the actual position with the calculated position of the calibration point.

2. The system according to claim 1, wherein
   the processor is further configured to
   calculate a differential between the actual position and the calculated position of the calibration point, and
   generate the calibration data from the differential.

3. The system according to claim 1, wherein
   the processor is further configured to
   derive a representative value from a plurality of positions of the receiver acquired a plurality of times over a predetermined time period, and
   acquire the calculated position of the calibration point from the representative value.

4. The system according to claim 1, wherein
   the processor is further configured to
   acquire an azimuth angle in a traveling direction of the work machine with respect to a predetermined reference azimuth,
   acquire a converted actual position by performing coordinate conversion on the actual position in an opposite direction of the azimuth angle,
   acquire a converted calculated position by performing coordinate conversion on the calculated position in the opposite direction of the azimuth angle, and
   generate the calibration data by comparing the converted actual position and the converted calculated position.

5. The system according to claim 1, wherein
   the processor is further configured to
   calculate a differential between the actual position and the calculated position,
   acquire a pitch angle of the work machine, and
   generate the calibration data by correcting the differential based on the pitch angle.

6. The system according to claim 1, wherein
   the processor is further configured to
   calculate a differential between the actual position and the calculated position,
   acquire a roll angle of the work machine, and
   generate the calibration data by correcting the differential based on the roll angle.

7. The system according to claim 1, wherein
   the work machine includes
   a vehicle body with the receiver attached thereto, and
   a work implement movably attached to the vehicle body, and
   the reference point and the calibration point are located on the work implement.

8. The system according to claim 1, further comprising:
   an input device connected to the processor,
   the processor being further configured to acquire the actual position of the calibration point through the input device.

9. The system according to claim 1, wherein
   the processor is further configured to use at least one of an inclination angle of a vehicle body of the work machine and an azimuth of angle of the work machine to calculate the position of the calibration point.

10. A method executed by a processor, the method comprising:
    acquiring a position of a receiver mounted on the work machine from a signal received by the receiver;
    acquiring a calculated position of a calibration point on the work machine by calculating a position of the calibration point based on the position of the receiver and vehicle body dimension data of the work machine;
    acquiring an actual position of the calibration point by measuring with a measurement device; and
    generating calibration data usable to calibrate a position of a reference point on the work machine by comparing the actual position and the calculated position of the calibration point.

11. The method according to claim 10, wherein
    the generating the calibration data includes calculating a differential between the actual position and the calculated position of the calibration point, and generating the calibration data from the differential.

12. The method according to claim 10, wherein
the acquiring the calculated position of the calibration point includes
    deriving a representative value from a plurality of positions of the receiver acquired a plurality of times over a predetermined time period, and
    acquiring the calculated position from the representative value.

13. The method according to claim 10, further comprising:
    acquiring an azimuth angle in a traveling direction of the work machine with respect to a predetermined reference azimuth;
    acquiring a converted actual position by performing coordinate conversion on the actual position in an opposite direction of the azimuth angle; and
    acquiring a converted calculated position by performing coordinate conversion on the calculated position in the opposite direction of the azimuth angle,
    the generating the calibration data including generating the calibration data by comparing the converted actual position and the converted calculated position.

14. The method according to claim 10, wherein
the generating the calibration data includes
    calculating a differential between the actual position and the calculated position,
    acquiring a pitch angle of the work machine, and
    generating the calibration data by correcting the differential based on the pitch angle.

15. The method according to claim 10, wherein
the generating the calibration data includes
    calculating a differential between the actual position and the calculated position,
    acquiring a roll angle of the work machine, and
    generating the calibration data by correcting the differential based on the roll angle.

16. The method according to claim 10, wherein
the work machine includes
    a vehicle body with the receiver attached thereto, and
    a work implement movably attached to the vehicle body, and
the reference point and the calibration point are located on the work implement.

17. The method according to claim 10, wherein
the acquiring the actual position of the calibration point includes acquiring the actual position through an input device.

18. The method according to claim 10, wherein
the calculating the position of the calibration point further includes using at least one of an inclination angle of a vehicle body of the work machine and an azimuth of angle of the work machine.

* * * * *